(12) United States Patent
Baker et al.

(10) Patent No.: US 11,440,357 B2
(45) Date of Patent: Sep. 13, 2022

(54) DEVICES FOR REDUCING TIRE NOISE

(71) Applicant: Bridgestone Americas Tire Operations, LLC, Nashville, TN (US)

(72) Inventors: Christopher R. Baker, Akron, OH (US); Paul Zakelj, Stow, OH (US); Robert W. Asper, Wadsworth, OH (US)

(73) Assignee: BRIDGESTONE AMERICAS TIRE OPERATIONS, LLC, Nashville, TN (US)

( * ) Notice: Subject to any disclaimer, the term of this patent is extended or adjusted under 35 U.S.C. 154(b) by 390 days.

(21) Appl. No.: 16/335,016

(22) PCT Filed: Sep. 19, 2017

(86) PCT No.: PCT/US2017/052263
§ 371 (c)(1),
(2) Date: Mar. 20, 2019

(87) PCT Pub. No.: WO2018/057512
PCT Pub. Date: Mar. 29, 2018

(65) Prior Publication Data
US 2019/0248192 A1    Aug. 15, 2019

Related U.S. Application Data

(60) Provisional application No. 62/398,574, filed on Sep. 23, 2016.

(51) Int. Cl.
*B60C 19/00* (2006.01)
*B60C 5/14* (2006.01)
*B29D 30/00* (2006.01)

(52) U.S. Cl.
CPC ........ *B60C 19/002* (2013.01); *B29D 30/0061* (2013.01); *B60C 5/14* (2013.01); *B60C 2200/06* (2013.01)

(58) Field of Classification Search
CPC ......... B60C 19/00; B60C 19/002; B60C 5/00; B60C 5/14
See application file for complete search history.

(56) References Cited

U.S. PATENT DOCUMENTS 4,399,851 A    8/1983   Bschorr
4,889,578 A *  12/1989  Kei .......................... C08J 5/124
                                                                156/294

(Continued)

FOREIGN PATENT DOCUMENTS

DE    4120878    12/1992
DE    19806935    9/1999

(Continued)

OTHER PUBLICATIONS

Poly-Tech Industrials,https://www.polytechindustrial.com/products/plastic-stock-shapes/uhmw-polyethylene, accessed on [Mar. 11, 2021 12:41:57 PM], (Year: 2011).*

(Continued)

*Primary Examiner* — Cedrick S Williams
(74) *Attorney, Agent, or Firm* — Shaun Fox; Bryan Jaketic

(57) ABSTRACT

A noise damper, annulus for reducing tire noise, and tire and noise damper assembly are disclosed. The noise damper, annulus for reducing tire noise, and tire and noise damper assembly mitigate sound produced by a moving tire. The noise damper and annulus for reducing tire noise may move within a tire cavity.

6 Claims, 6 Drawing Sheets

(56) References Cited

U.S. PATENT DOCUMENTS

| | | | |
|---|---|---|---|
| 5,435,363 A * | 7/1995 | Pender | B60C 17/061 |
| | | | 152/158 |
| 7,556,075 B2 | 7/2009 | Tanno | |
| 7,717,146 B2 | 5/2010 | Yukawa | |
| 7,854,244 B2 | 12/2010 | Tanno | |
| 7,886,789 B2 | 2/2011 | Yukawa | |
| 8,136,560 B2 | 3/2012 | Tanno | |
| 8,387,670 B2 | 3/2013 | Tanno | |
| 8,544,510 B2 | 10/2013 | Yukawa | |
| 8,888,939 B2 | 11/2014 | Bormann | |
| 8,905,099 B2 | 12/2014 | Tanno | |
| 8,997,806 B2 | 4/2015 | Tanno | |
| 2007/0074798 A1 | 4/2007 | Tanno | |
| 2009/0071585 A1 | 3/2009 | Tanno | |
| 2009/0090446 A1 | 4/2009 | Tanno | |
| 2009/0308519 A1 | 12/2009 | Ishihara | |
| 2009/0314402 A1 | 12/2009 | Tanno | |
| 2010/0038005 A1 * | 2/2010 | Aoki | B60C 17/065 |
| | | | 152/450 |
| 2010/0071820 A1 | 3/2010 | Siegfried | |
| 2010/0270101 A1 | 10/2010 | Yukawa | |
| 2011/0308677 A1 | 12/2011 | Benoit | |
| 2011/0308704 A1 | 12/2011 | Sandstrom et al. | |
| 2012/0325383 A1 | 12/2012 | Stirlen | |
| 2013/0032262 A1 | 2/2013 | Pan | |
| 2013/0048180 A1 | 2/2013 | Song | |
| 2014/0246133 A1 | 9/2014 | Lamontia | |
| 2015/0034414 A1 * | 2/2015 | Arata | B32B 7/02 |
| | | | 181/290 |

FOREIGN PATENT DOCUMENTS

| | | | | |
|---|---|---|---|---|
| DE | 102009024454 | 12/2010 | | |
| DE | 102015212105 | 7/2016 | | |
| EP | 2623337 | 8/2013 | | |
| GB | 2509976 | 7/2014 | | |
| JP | 07052616 A * | 2/1995 | | B60C 19/002 |
| JP | H0752616 A * | 6/1995 | | B60C 19/002 |
| JP | 2005205937 | 8/2005 | | |
| JP | 2005238888 | 9/2005 | | |
| JP | 2006256531 | 9/2006 | | |
| JP | 2016298299 | 11/2006 | | |
| JP | 2006335208 | 12/2006 | | |
| JP | 2006341681 | 12/2006 | | |
| JP | 2007099162 | 4/2007 | | |
| JP | 2007160979 | 6/2007 | | |
| JP | 2009286271 | 12/2009 | | |
| JP | 2015107690 | 6/2015 | | |
| WO | 2015059493 | 4/2015 | | |
| WO | 2015076380 | 5/2015 | | |
| WO | 2015083727 | 6/2015 | | |
| WO | 2016113013 | 7/2016 | | |

OTHER PUBLICATIONS

Consumer Reports (Year: 1994).*
International Search Report and Written Opinion; Corresponding PCT Application No. PCT/US2017052263 (international filing date Sep. 19, 2017); Authorized Officer Lee, Jong Kyung; dated Feb. 7, 2018.
European Search Report and Opinion; Corresponding EP Application No. 17853750.2; dated May 6, 2020.

* cited by examiner

DEVICES FOR REDUCING TIRE NOISE

FIELD OF INVENTION

This disclosure relates to the reduction of noises generated by tires as they contact the road. More particularly, the disclosure relates to devices inserted within tires to reduce such noise. Even more particularly, the disclosure describes noise dampers, noise dampening annuluses, and tires including noise dampers. The noise reducing devices are permitted to move within the tire.

BACKGROUND

Known tire noise dampers, for example, are placed within the tire and permanently affixed to a tire innerliner. The dampers may include foam or fibers. The dampers reduce sound noise within the tire, and thus reduce noise emitted from the tire.

SUMMARY OF THE INVENTION

A noise damper, configured for use within a passenger, light-truck, or truck-and-bus-radial tire, comprises a foam body, configured for use within a passenger, light-truck, or truck-and-bus-radial tire, a thin film that attaches to the foam body, and an adhesive that bonds the foam body to the thin film. The foam body includes at least one generally flat surface that is configured to conform to a tire innerliner and a radial height and an axial length that is between three and six times the radial height. The foam body is made of compressible and elastic open-cell foam. The thin film has a generally flat surface that substantially coincides with the generally flat surface of the foam body, includes a radial height that is between 0.005-10% of the radial height of the foam body, and the thin film is made of ultra-high-molecular-weight polyethylene and has a coefficient of friction of 0.07-0.12.

In another embodiment an annulus for insertion into a tire cavity is provided. The annular comprises a foam body configured for use within a tire, a thin film, and an adhesive that bonds the foam body to the thin film. The foam body includes at least one generally flat surface that is configured to conform to a tire innerline, and the foam body is made of compressible and elastic open-cell foam. The thin film has a generally flat surface that substantially coincides with the generally flat surface of the foam body; it includes a radial height that is between 0.005-10% of the radial height of the foam body and is made of ultra-high-molecular-weight polyethylene. The annulus reduces tire noise by at least 5 dB.

In another embodiment, a tire and noise damper assembly is provided. The assembly includes a tire, a noise damper comprising a foam mass, a thin film attached to the foam mass, and a lubricant. The tire comprises a first annular bead and a second annular bead, a body ply extending between the first annular bead and the second annular bead, an annular belt package, disposed radially upward of the body ply and extending axially across a portion of the body ply, a circumferential tread disposed radially upward of the annular belt package and extending axially across a portion of the body ply, and a first sidewall extending between the first annular bead and a first shoulder, the first shoulder being associated with the circumferential tread, and a second sidewall extending between the second annular bead and a second shoulder, the second shoulder being associated with the circumferential tread. The noise damper comprises at least one foam mass, made of a compressible and elastic open-cell foam, including at least one generally flat surface that is configured to conform to a tire innerliner and a thin film. The thin film includes a generally flat surface that substantially coincides with the generally flat surface of the foam mass and a radial height that is between 0.05-10% of the radial height of the foam mass.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIGS. 1b-1f are cross-sectional views of alternative embodiments of the noise damper shown in FIG. 1a;

FIG. 2b is a cross-sectional view of alternative embodiment of the noise dampening annulus shown in FIG. 2a;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread depth" refers to the distance between a top surface of the tread and the bottom of a major tread groove.

"Tread width" refers to the width of the ground contact area of a tread which contacts with the road surface during the rotation of the tire under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component. Furthermore, to the extent the term "under" is used in the specification or claims, it is intended to mean not only "directly under" but also "indirectly under" where intermediary tire layers or components are disposed between two identified components or layers.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1A:
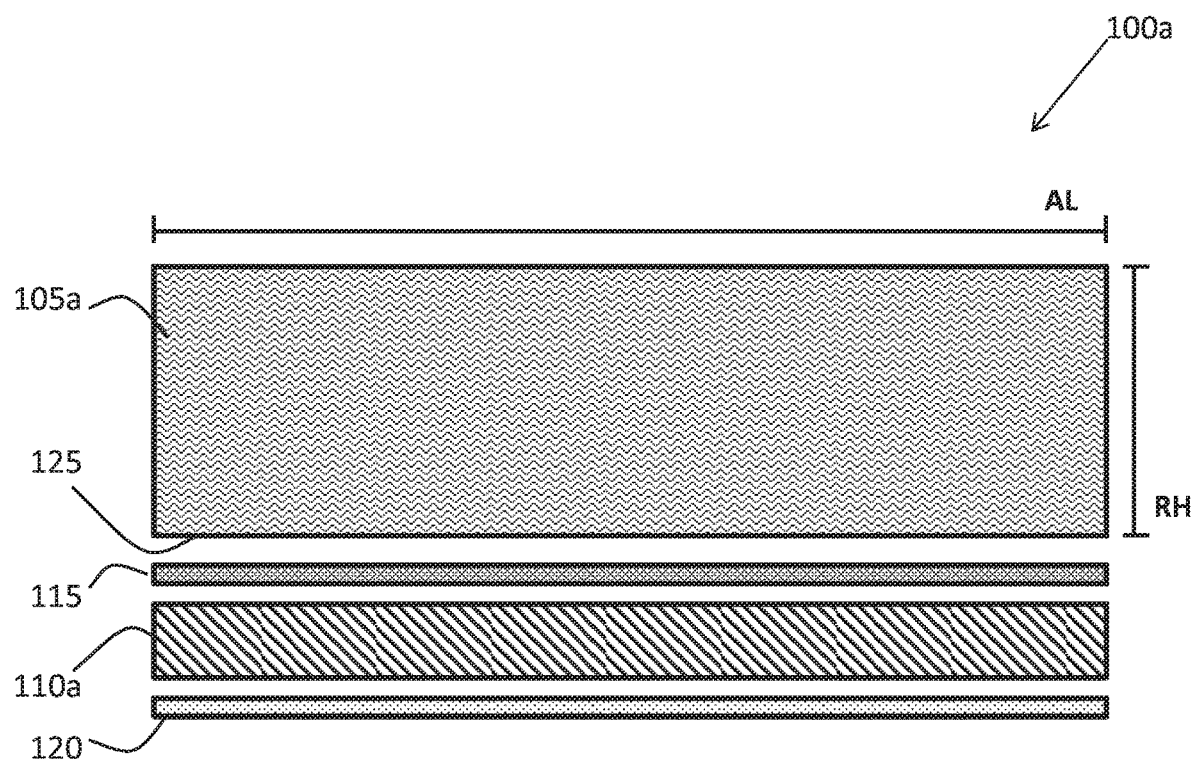
FIG. 1a is an exploded cross sectional view of an embodiment of a noise damper configured for use within a tire.

FIG. 1a is an exploded cross sectional view of an embodiment of a noise damper 100a configured for use within a passenger, light-truck, or truck-and-bus-radial tire. As shown in FIG. 1a, noise damper 100a includes a foam body 105a, a thin film 110a that attaches to foam body 105a, and an adhesive 115 that bonds foam body 105a to thin film 110a. An optional lubricant 120 is further provided. The foam body, adhesive, thin film, and lubricant are not depicted to scale, and space has been added between them for illustrative purposes.

Foam body 105a is depicted with a rectangular cross section. Thus, foam body 105a has at least one generally flat surface 125 that is configured to conform to a tire innerliner. In one embodiment (not shown), the foam body conforms to the tire innerliner by mechanical deformation. In another embodiment, the generally flat surface includes a slight arch so that the foam body is preformed to match a tire innerliner's curvature.

In FIG. 1a, noise damper 100a extends linearly. Thus, in one embodiment, noise damper 100a is a rectangular prism. In another embodiment (not shown), the noise damper is configured into an annulus.

Although not shown in the figures, the foam body may be made from compressible and elastic open-cell foam such as polyurethane, polyester, polyether, or melamine. The foam has a sound absorption coefficient between 0.4 and 1.5. In an alternative embodiment, the foam has a sound absorption coefficient between 0.7 and 1.1.

Foam body 105a has a radial height (RH) and an axial length (AL). In one embodiment, the axial length is between 3 and 6 times the radial height. In additional embodiments, the foam body is configured according to one of the following exemplary dimensions:

| RH (mm) | AL (mm) |
|---|---|
| 20 | 110 |
| 20 | 140 |
| 20 | 170 |
| 30 | 110 |
| 30 | 140 |
| 30 | 170 |

-continued

| RH (mm) | AL (mm) |
|---|---|
| 40 | 60 |
| 40 | 90 |
| 40 | 120 |

In another embodiment, the dimensions are specifically configured for a particular size of a tire. In yet another embodiment, the dimensions are configured for use across multiple tires. As one of ordinary skill in the art will understand, the axial length can vary based on, amongst other things, tire application and noise suppression desired.

With continued reference to FIG. 1a, noise damper 100a further includes thin film 110a. Thin film 110a is made of ultra-high-molecular-weight polyethylene having a coefficient of friction between 0.07-0.12. The thin film has a radial height (not labeled) that is between 0.005-10% of the radial height (RH) of foam body 105. In an alternative embodiment (not shown), the thin film has a radial height between 0.01-1.0% of the radial height of the foam body. In another alternative embodiment, the thin film has a radial height between 50-200 microns.

Noise damper 100a further includes an adhesive 115. Adhesive 115 bonds foam body 105a to thin film 110a. The adhesive can be applied to the foam body or the thin film. Exemplary adhesives include, without limitation, gels, liquids, sprays, or tape.

As shown in FIG. 1a, noise damper 100a further includes an optional lubricant 120 that is disposed on thin film 110a. In an alternative embodiment (not shown), the lubricant is applied to a tire innerliner. In an alternative embodiment, the lubricant further comprises a cooling additive.

Because noise damper 100a (including foam body 105a and thin film 110a) is not affixed to a tire, noise damper 100a is free to move (e.g., rotate or translate) within a tire cavity.

FIGS. 1b-1f are cross-sectional views of alternative embodiments of the noise damper 100a shown in FIG. 1a. FIGS. 1b-1f omit adhesive 115 (e.g., the noise damper may include a thin film that is integrated with the foam body; alternative embodiments may include an adhesive, which is not shown in FIGS. 1b-1f).

Figure 1B:
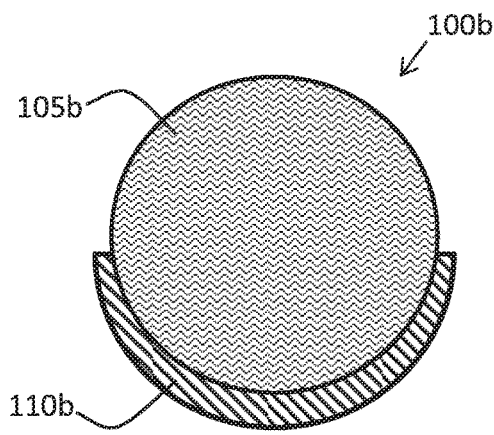

In particular, FIG. 1b shows an alternative embodiment of a noise damper 100b. Noise damper 100b has a circular cross section and thin film 110b extends across 40-60% of foam body 105b's surface area.

Figure 1C:
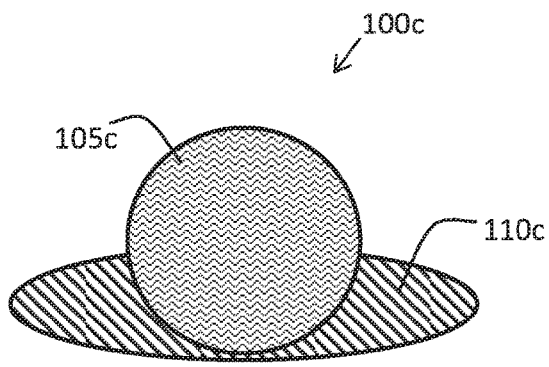

FIG. 1c shows another alternative embodiment of a noise damper 100c that has a circular foam body 105c, and an elliptical film 110c. In the embodiment shown in FIG. 1c, elliptical film 110c extends beyond the edge of foam body 105c. In a specific embodiment (not shown), the film has an axial length that is 5-100% the axial length of the foam body.

Figure 1D:
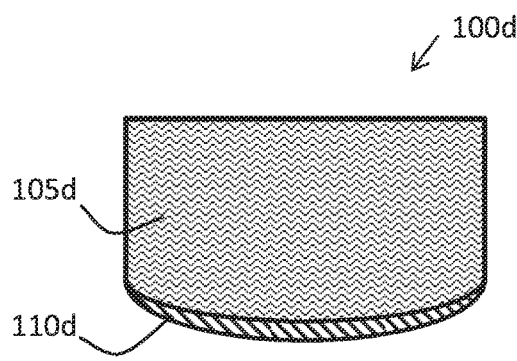

FIG. 1d shows yet another alternative embodiment of a noise damper 100d with a generally rectangular cross section. The bottom edge of noise damper 100d is preconfigured to match a tire innerliner's curvature.

Figure 1E:
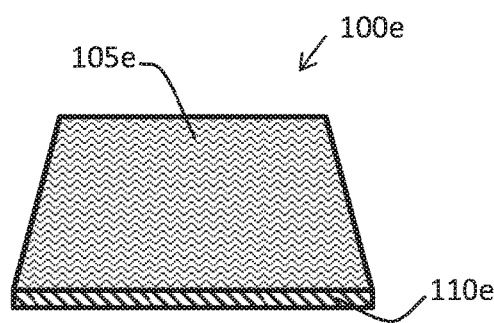

FIG. 1e shows still another alternative embodiment of a noise damper 100e with a substantially trapezoidal cross section. Either the top or bottom bases may be configured to match a tire innerliner's curvature.

Figure 1F:
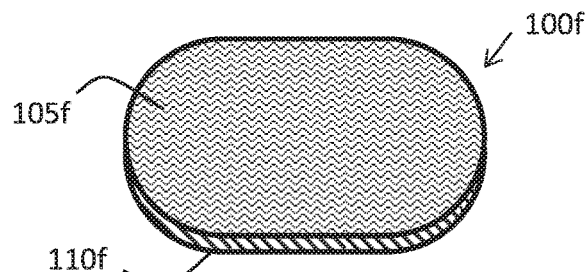

FIG. 1f shows an additional alternative embodiment of a noise damper 110f with a capsular cross section.

The exemplary embodiments shown in FIGS. 1a-1f are not meant to be limiting. As one of ordinary skill in the art will understand, and as shown in FIGS. 1a-1f, a wide variety of cross sections are suitable for the noise damper. Suitable exemplary shapes include, without limitation, a capsule, circle, crescent, oval, ring, square, or trapezoid. Additionally, although not shown, the foam body may further include protrusions (e.g., without limitation, pyramidal and ellipsoidal protrusions), depressions, tunnels, or surface fibers.

Figure 2A:
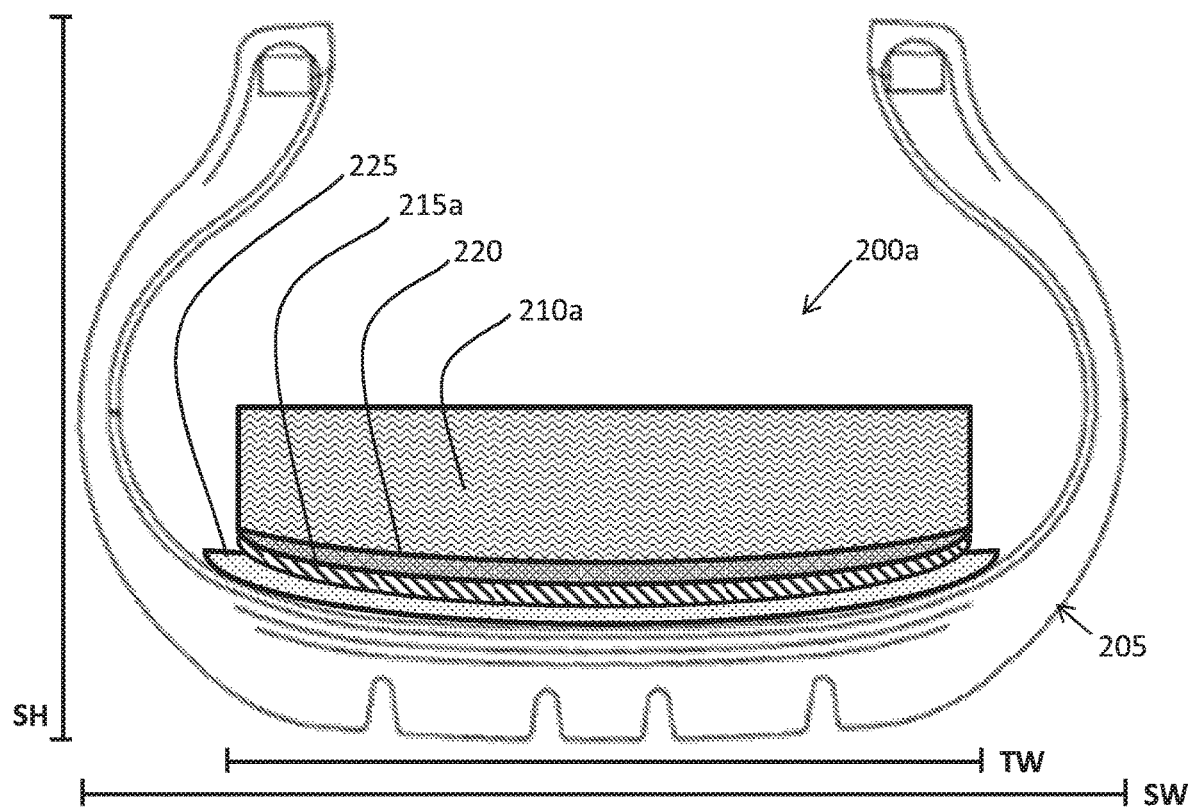
FIG. 2a is a cross-sectional view of a noise dampening annulus and a tire.

FIG. 2a is a cross-sectional view of a noise dampening annulus 200a inside a tire 205. In the illustrated embodiment, annulus 200a includes a foam body 210a, a thin film 215a, and an adhesive 220 that bonds foam body 210a to thin film 215a. A lubricant 225 may also be provided. Annulus 200a is free to move (e.g., rotate or translate) within the tire cavity.

As shown in FIG. 2a, foam body 210a is substantially similar to the foam bodies 105a-f discussed with relation to FIGS. 1a-f. Likewise, thin film 215 and adhesive 220 are substantially similar to the thin films 110a-f and adhesive 115 discussed with relation to FIGS. 1a-f.

With continued reference to FIG. 2a and tire 205, foam body 210a is depicted as spanning approximately 85-95% of the tread width (TW) and 20-25% of the section height (SH). In additional embodiments, the foam body spans between 70-105% of the tread width and 30-60% of the section height. The foam body's length and height may be set independently of each other.

Figure 2B:
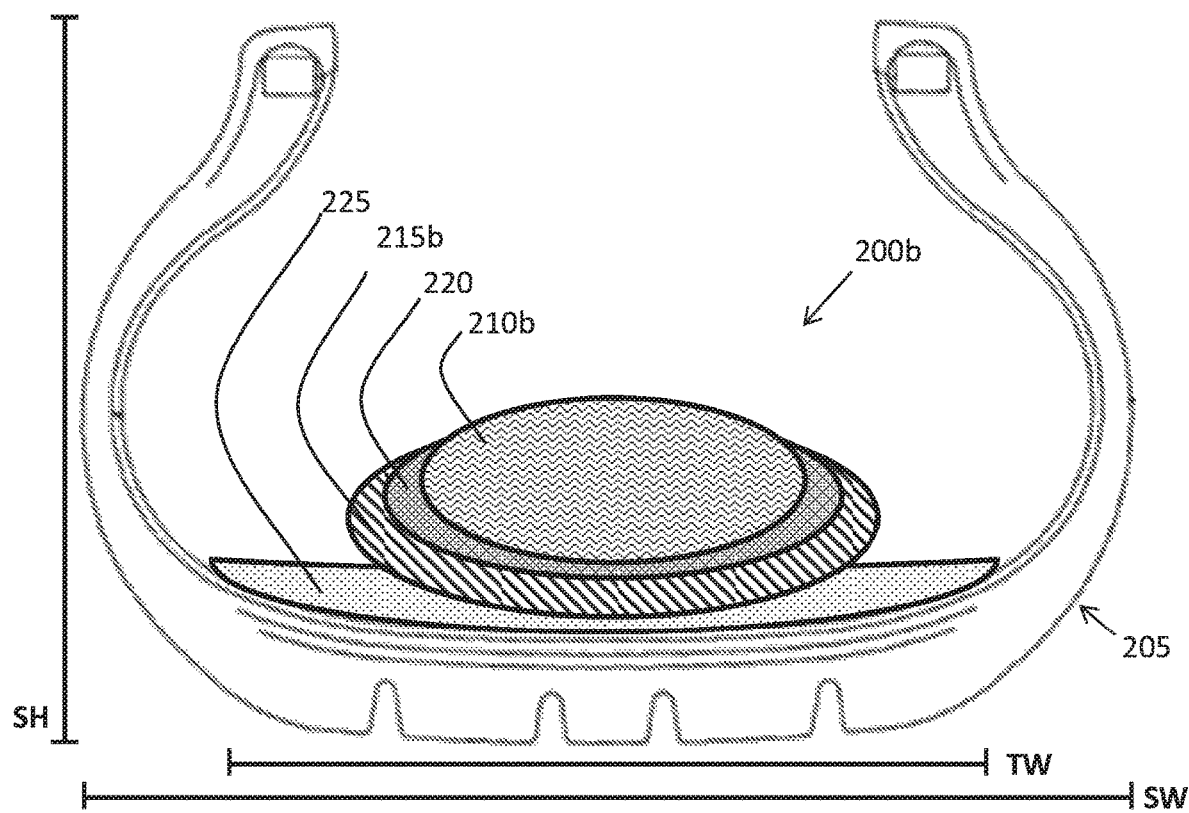

FIG. 2b is a cross-sectional view of alternative embodiment of the noise dampening annulus shown in FIG. 2a. As shown in FIG. 2b, annulus 200b is substantially elliptical. Foam body 210b is depicted as spanning approximately 50-60% of the tread width (TW) and 20-25% of the section height (SH). In additional embodiments, the foam body spans between 10-40% of the tread width and 5-35% of the section height. The foam body's length and height may be set independently of each other.

As also shown in FIG. 2b, thin film 215b covers 40-70% of foam body 210b's surface area. In an alternative embodiment (not shown), the thin film covers 30-50% of the foam body's surface area.

Figure 2C:
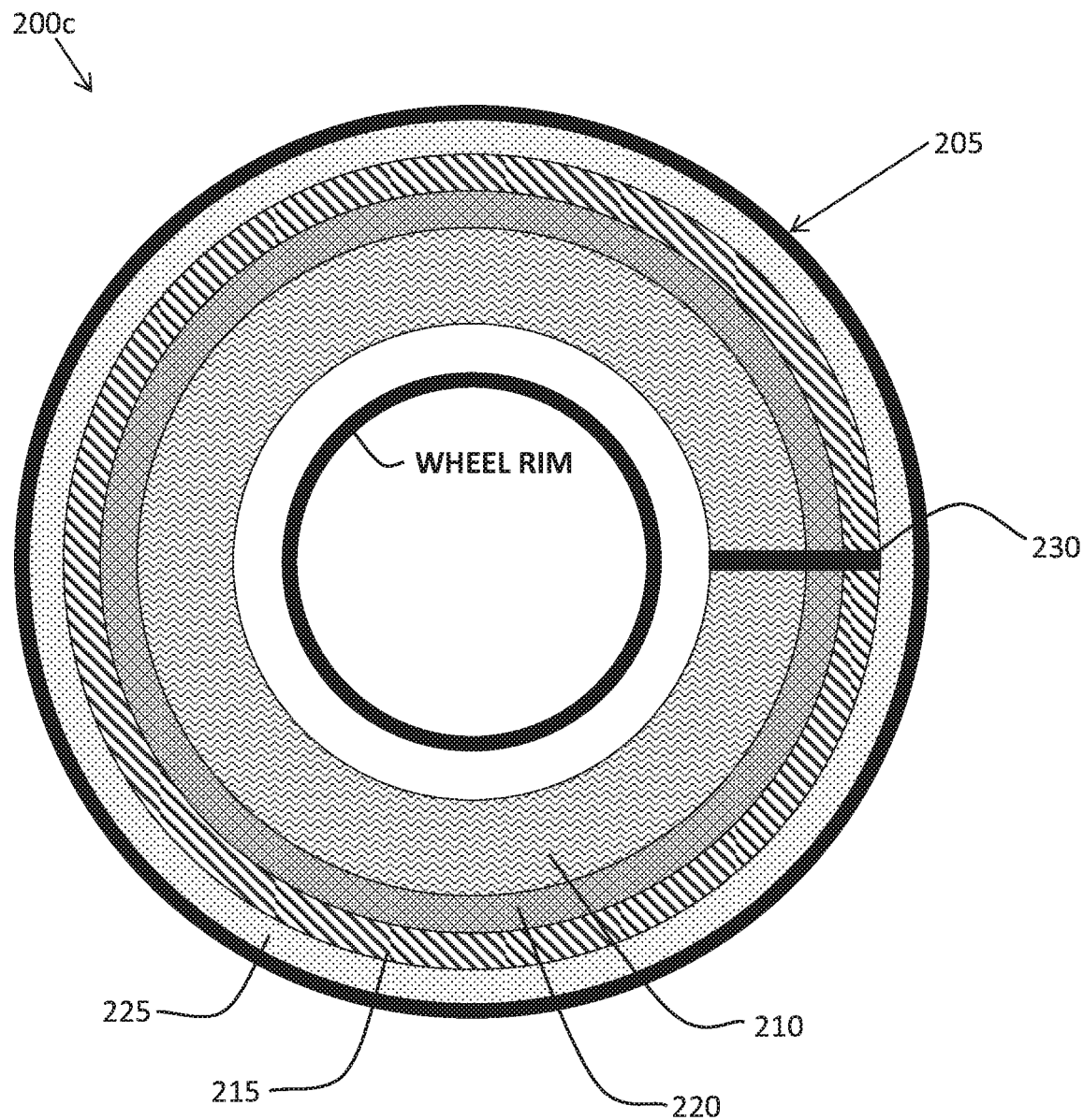
FIG. 2c is a schematic drawing illustrating a cross-sectional side view of a noise dampening annulus.

FIG. 2c is a cross-sectional side view of a noise dampening annulus 200c and tire 205. Noise dampening annulus 200c is substantially similar to the noise dampening annuluses 200a and 200b depicted in FIGS. 2a and 2b. Annulus 200c further includes a splice 230 that joins the annulus. The splice may be chemical or mechanical.

Although not shown, the annulus 200c includes an outer diameter. In a particular embodiment, the outer diameter of the annulus is 95-140% of a wheel diameter. In this embodiment, the annulus is constrained by the tire and imparts a light force on it, which thereby slightly hinders its movement within the tire.

Figure 3:
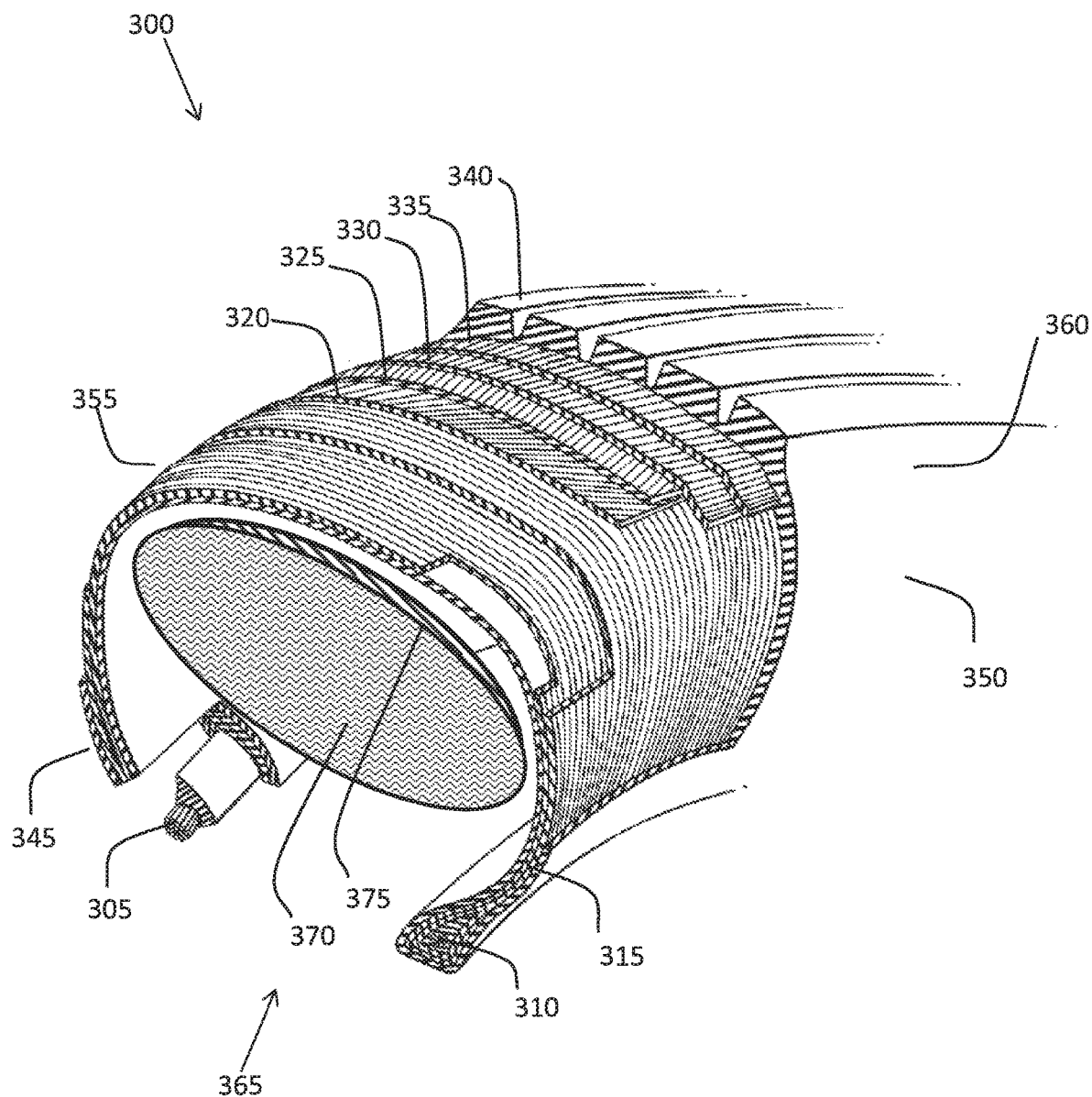
FIG. 3 is a peel-away cross-sectional perspective view of an embodiment of a tire and noise damper assembly.

FIG. 3 is a peel-away cross-sectional perspective view of an embodiment of a tire 300 and noise damper 365 assembly.

As shown, tire 300 includes a first annular bead 305 and a second annular bead 310. The annular beads 305 and 310, in part, secure tire 300 to a wheel (not shown). In an alternative embodiment (not shown), the tire comprises four or more beads.

As shown, tire 300 further includes a body ply 315 extending between first annular bead 305 and second annular bead 310. Body ply 315 forms an annulus and imparts shape to the tire. As one of ordinary skill in the art will understand, body ply 315 may contain reinforcing cords or fabric (not shown). In alternative embodiments (not shown), various turn-up and turn-down configurations, or multiple body plies, are used.

Tire 300 further comprises a first circumferential belt 320 and a second circumferential belt 325. First circumferential belt 320 is disposed radially upward of body ply 315 and extends axially across a portion of body ply 315. Second circumferential belt 325 is disposed radially upward of first circumferential belt 320 and extends axially across a portion of body ply 315. The circumferential belts reinforce the tire and increase its stiffness. As one of ordinary skill in the art will understand, the circumferential belts may contain steel cords and reinforcing cords (both not shown). In an alternative embodiment (not shown), the tire contains a third and/or fourth circumferential belt.

Tire 300 further includes cap plies 330 and 335. First cap ply 330 is disposed radially upward of circumferential belts 320 and 325 and extends axially across a portion of body ply 315. Second cap ply 335 is disposed radially upward of first cap ply 330 and extends axially across a portion of body ply 315. The cap plies restrict tire expansion when the tire rotates. In an alternative embodiment (not shown), the plies are omitted.

Tire 300 further comprises a circumferential tread 340. Circumferential tread 340 is disposed radially upward of circumferential belts 320 and 325 and extends axially across a portion of body ply 315. Circumferential grooves (not labeled) divide circumferential tread 340 into ribs. As one of ordinary skill in the art will understand, circumferential tread 340 is affixed to tire 300 when tire 300 is new. In an alternative embodiment (not shown), the circumferential tread is affixed as a retread.

Tire 300 further comprises a first sidewall 345 and a second sidewall 350. First sidewall 345 extends between the first annular bead 305 and a first shoulder 355, which is proximately associated with an edge of circumferential tread 340. Second sidewall 350 extends between the second annular bead 310 and a second shoulder 360, which is proximately associated with an opposite edge of circumferential tread 340. In an alternative embodiment (not shown), the sidewalls are proximately associated with an undertread (not shown).

Tire 300 further comprises a noise damper 365. Noise damper 365, which includes a foam body 370 and a thin film 375, fits inside the tire cavity (not labeled) and reduces noise within the tire cavity. It is free to move (e.g., rotate or translate) within the tire cavity. In one embodiment, one of the noise dampers 100 described above constitutes the noise damper. In another embodiment, one of the noise dampening annuluses 200 described above constitutes the noise damper.

What is claimed is:

1. A noise damper, configured for use within a passenger, light-truck, or truck-and-bus-radial tire, comprising:
   a foam body, configured for use within a passenger, light-truck, or truck-and-bus-radial tire, the noise damper being configured to move freely within the tire,
   a thin film that attaches to the foam body,
   a lubricant disposed on a first side of the thin film to allow the noise damper to move freely against a surface of the tire, and
   an adhesive that bonds the foam body to a second side of the thin film, wherein:
   the foam body includes at least one generally flat surface that is configured to conform to a tire innerliner,
   the foam body includes a radial height and an axial length that is between three and six times the radial height;
   the foam body is made of compressible and elastic open-cell foam;

the thin film has a generally flat surface that substantially coincides with the generally flat surface of the foam body;
the thin film includes a radial height that is between 0.005-10% of the radial height of the foam body; and
the thin film is made of ultra-high-molecular-weight polyethylene and has a coefficient of friction of 0.07-0.12.

2. The noise damper of claim 1, wherein the foam body has a sound absorption coefficient between 0.4 and 1.5.

3. The noise damper of claim 1, wherein the thin film has a radial height between 50-200 microns.

4. The noise damper of claim 1, wherein the foam body further includes pyramidal protrusions.

5. The noise damper of claim 1, wherein the noise damper is configured into an annulus.

6. The noise damper of claim 5, wherein an outer diameter of the annulus is 110-140% of a diameter of the tire.

* * * * *